(12) United States Patent
Pamoti et al.

(10) Patent No.: US 11,809,750 B1
(45) Date of Patent: Nov. 7, 2023

(54) AUTOMATED OVERLAY REGROUPING

(71) Applicant: Western Digital Technologies, Inc., San Jose, CA (US)

(72) Inventors: Venkatesh Naidu Pamoti, Bangalore (IN); Sabith B N, Bangalore (IN); Disha Parwani, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 86 days.

(21) Appl. No.: 17/729,346

(22) Filed: Apr. 26, 2022

(51) Int. Cl.
G06F 3/06 (2006.01)

(52) U.S. Cl.
CPC .......... G06F 3/0659 (2013.01); G06F 3/0604 (2013.01); G06F 3/0653 (2013.01); G06F 3/0679 (2013.01)

(58) Field of Classification Search
CPC .... G06F 3/0604; G06F 3/0659; G06F 3/0653; G06F 3/0679
See application file for complete search history.

(56) References Cited

U.S. PATENT DOCUMENTS

| | | | |
|---|---|---|---|
| 7,962,684 B2 | 6/2011 | Struk et al. | |
| 8,171,206 B2 | 5/2012 | Struk et al. | |
| 11,079,967 B2 * | 8/2021 | Lee | G06F 12/0638 |
| 2009/0210615 A1 * | 8/2009 | Struk | G06F 12/123 |
| | | | 711/E12.001 |
| 2010/0023673 A1 * | 1/2010 | Struk | G06F 12/08 |
| | | | 711/E12.008 |
| 2018/0165219 A1 * | 6/2018 | Yang | G06F 12/121 |
| 2019/0227938 A1 * | 7/2019 | Gopalakrishnan | |
| | | | G06F 12/0868 |
| 2020/0310692 A1 * | 10/2020 | Lee | G06F 3/0629 |

* cited by examiner

*Primary Examiner* — Ryan Bertram
(74) *Attorney, Agent, or Firm* — Armstrong Teasdale LLP

(57) ABSTRACT

In one example, a system includes a flash memory, a Random-Access Memory (RAM), and a controller. The flash memory stores first and second initial overlays, where the first initial overlay includes a first overlay function and the second initial overlay includes a second overlay function. The controller copies the first initial overlay into the RAM based on the first overlay function being called, swaps the first initial overlay with the second initial overlay based on the second overlay function being called, and monitors functions calls between the first and second overlay functions over a monitoring period. The controller determines whether a number of the function calls is greater than a threshold value, and based at least in part on the number of function calls being greater than the threshold value, regroups the first and second overlay functions into a new overlay, and stores the new overlay in the flash memory.

20 Claims, 5 Drawing Sheets

AUTOMATED OVERLAY REGROUPING

BACKGROUND

In computing, overlaying refers to the process of transferring a block of program code into main memory and replacing what was previously stored. Groups of overlays in firmware are software programs that are typically larger than the Random-Access Memory (RAM) of the system. However, an individual overlay is sized to fit into the portion of RAM set aside for temporarily storing overlays.

Initially, overlays are stored in flash or other non-volatile memory, and are copied during runtime to a known address in RAM and executed as needed. An overlay typically includes a finite number of overlay functions, that are executable once the overlay is copied to RAM. Once an overlay is loaded into RAM, it remains until evicted by another overlay. This may occur when a new function is called that is located in a different overlay, and insufficient space in RAM is available for both the current overlay(s) loaded in RAM and the new overlay.

Different overlay functions may reside in different overlays, without any particular relationship to each other. At runtime, calling functions residing in different overlays results in different overlays being swapped-in and swapped-out of RAM, which can impact the performance of the system. Accordingly, it would be advantageous to mitigate performance issues related to excessive overlay swapping into and out of RAM.

SUMMARY

The present application describes dynamically re-grouping overlay functions stored in flash memory to improve performance when consecutive function calls between the overlay functions occurs. Overlays are stored in flash or other non-volatile memory and are copied during runtime to a known address in RAM and executed as needed. An overlay typically includes a finite number of overlay functions, that are executable once the overlay is copied to RAM. Once an overlay is loaded into RAM, it remains until evicted by another overlay. In the examples described herein, consecutive function call activity between the overlay functions are monitored, and the overlay functions are re-organized dynamically into new overlays based on the consecutive function call activity. The new overlays are stored in flash and are subsequently used during execution of the firmware by swapping the new overlays into and out of the RAM based on the function calls to the overlay functions. When a consecutive function call occurs between the overlay functions, the overlay functions are more likely to be resident together in RAM, which reduces the amount of swapping of overlays into and out of RAM, thereby improving the performance.

Accordingly, the present application describes a system for dynamically re-grouping overlay functions. The system includes a flash memory, a RAM, and a controller. The flash memory is configured to store a first initial overlay and a second initial overlay, where the first initial overlay includes a first overlay function and the second initial overlay includes a second overlay function. The controller is configured to copy the first initial overlay into the RAM based on the first overlay function being called for execution by firmware, swap the first initial overlay with the second initial overlay based on the second overlay function being called for execution by the firmware, and monitor functions calls between the first overlay function and the second overlay function over a monitoring period. The controller is further configured to determine whether a number of the function calls is greater than a threshold value, and based at least in part on the number of functions calls being greater than the threshold value, to re-group the first overlay function and the second overlay function into a new overlay, and to store the new overlay in the flash memory.

The present application also describes a method of dynamically re-grouping overlay functions. The method includes storing, in a flash memory, a first initial overlay and a second initial overlay, where the first initial overlay includes a first overlay function and the second initial overlay includes second overlay function. The method further includes copying the first initial overlay into RAM based on the first overlay function being called, swapping the first initial overlay with the second initial overlay based on the second overlay function being called, and monitoring function calls between the first overlay function and the second overlay function. The method further includes determining whether a number of the function calls is greater than a threshold value, and based at least in part, on the number of the function calls being greater than the threshold value, re-grouping the first overlay function and the second overlay function into a new overlay, and storing the new overlay in the flash memory.

The present application also describes a system for dynamically re-grouping overlay functions. The system includes a flash memory and a RAM. The system includes a means for storing a first initial overlay and a second initial overlay, where the first initial overlay includes a first set of overlay functions and the second initial overlay includes a second set of overlay functions. The system further includes a means for copying the first initial overlay into the RAM based on at least on overlay function of the first set of overlay functions being called for execution by firmware. The system further includes a means for swapping the first initial overlay with the second initial overlay based on at least one overlay function of the second set of overlay functions being called for execution by the firmware. The system further includes a means for determining a number of function calls between each of the first set of overlay functions and the second set of overlay functions over a monitoring period. Based, at least in part, on the number of function calls being greater than a threshold value, the system further includes a means for re-grouping the at lest one overlay function from each of the first set of overlay functions and the second set of overlay functions into a new overlay, and a means for storing the new overlay in the flash memory.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
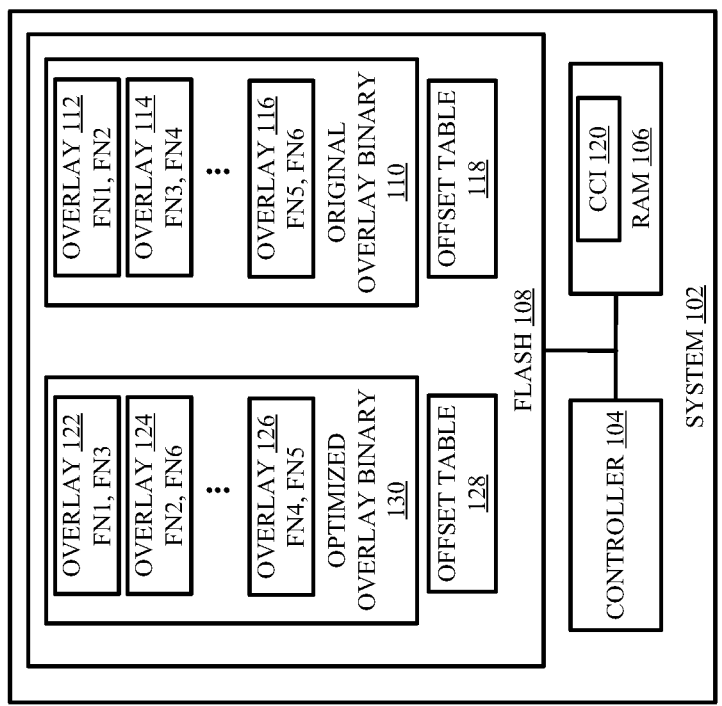
FIG. 1 illustrates a system for dynamically re-grouping overlay functions according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As briefly described above, the overlay functions assigned to a particular overlay may be grouped together arbitrarily. For example, some embedded systems utilize an Automated Overlay Manager (AOM) that automatically loads the appropriate overlay into RAM when a function stored in the overlay is called at runtime. In some cases, an AOM build tool at compile time or a build time performs overlay function grouping based on variables that are not necessarily ideal at runtime. For example, the AOM build tool may arbitrarily assign functions to the same overlay simply because they are similar in size. Due to the arbitrary nature of how overlay functions may be grouped together, overlay functions that often call each other may end up in different overlays. When the overlay functions call each other, their overlays may be swapped into and out of RAM, which is inefficient. For example, since the amount of RAM space allocated to load the overlays is limited, overlays currently resident in RAM may be evicted in order to make room for other overlays to be loaded into RAM prior to executing the called overlay functions. This type of excessive overlay swapping impacts the performance of the embedded system by increasing the function call latency between consecutively called functions that reside in different overlays, which is undesirable.

The present disclosure addresses these and other issues by monitoring function calls during runtime and identifying which overlay functions are called consecutively. New overlays are generated based on the identified call relationship of the overlay functions and are stored in non-volatile memory. Subsequent function calls between overlay functions residing in the same overlay are more likely to be resident in RAM, which reduces the amount of overlay swapping into and out of RAM for the system, thereby improving the performance of the system. Further, reading data out of flash can cause read disturb on the data stored in the flash. Reducing the amount of overlay reads from flash can also improve the performance of the system by reducing re-write activities for data disturbed by the read process.

FIG. 1 illustrates a system 102 for dynamically re-grouping overlay functions according to an example. In this example, system 102 comprises a controller 104 that is communicatively coupled to a RAM 106 and a flash memory device 108. Controller 104 comprises any component, system, or device that controls the operation of system 102 as described herein. RAM 106 and flash 108 comprise any component, system, or device that stores data. Flash 108, in particular, is a non-volatile memory which persistently stores data even when system 102 is unpowered. Flash 108 in this example stores original overlay binary 110, which include overlays 112, 114, 116. Original overlay binary 110 is a collection of executable code that may be loaded into flash 108 when the firmware is loaded into system 102. Flash 108 further stores an offset table 118 that is based on the initial organization of overlay functions FN1-FN6 in overlays 112, 114, 116. Offset table 118 is generated at compile time or build time based on how overlay functions FN1-FN6 are distributed between overlays 112, 114, 116. Generally, offset table 118 stores indexing information for calling overlay functions FN1-FN6 after the appropriate overlay 112, 114, 116 is loaded into RAM 106.

In this example, original overlay binary 110 is created at compile time or build time for the firmware of system 102. For example, original overlay binary 110 may be generated at compile time or build time by the AOM build tool based on a subset of the functions in a firmware image for system 102 that are specified in the firmware as overlay functions.

In this example, overlay 112 includes binary data executable by controller 104 for overlay functions FN1, FN2, overlay 114 includes executable binary data by controller 104 for overlay functions FN3, FN4, and overlay 116 includes executable binary data by controller 104 for overlay functions FN5, FN6. Generally, overlay functions FN1-FN6 are not directly executable out of flash 108 in some examples. Thus, overlays 112, 114, 116 are copied to RAM 106 prior to executing overlay functions FN1-FN6. In other examples, the performance of system 102 can be improved by copying overlay functions FN1-FN6 into RAM 106 prior to executing overlay functions FN1-FN6.

Both the number of overlays 112, 114, 116 depicted for original overlay binary 110 and the overlay functions FN1-FN6 stored by the overlays 112, 114, 116 are illustrated merely for purposes of discussion, and original overlay binary 110 may include a different number of overlays 112, 114, 116 and overlay functions FN1-FN6 in other examples.

At runtime, controller 104 executes resident firmware functions loaded in RAM 106. Resident functions are typically permanently available in RAM 106 while system 102 is operating. During program execution, the executing resident functions may call one or more overlay functions FN1-FN6. If an overlay that includes the called overlay function FN1-FN6 is currently loaded in RAM 106, then the execution continues in RAM 106 normally (e.g., execution moves from the resident function in RAM 106 to the called overlay function FN1-FN6 loaded into RAM 106). However, if an overlay that includes the called overlay function FN1-FN6 is not currently loaded in RAM 106, then the appropriate overlay 112, 114, 116 is loaded into RAM 106 depending on which of overlay function FN1-FN6 was called (e.g., by the AOM, not shown).

Once the appropriate overlay 112, 114, 116 is loaded into RAM 106, then execution continues in RAM 106 for the called overlay function FN1-FN6, using, for example, information in offset table 118 as an index. Once an overlay function (e.g., FN1) is loaded into RAM 106, overlay function FN1 can also call other overlay functions FN2-FN6. For example, overlay function FN1 may call overlay function FN6.

As discussed previously, problems can arise when consecutive overlay function calls are made to overlay functions FN1-FN6 that are included in different overlays 112, 114, 116. For example, overlay function FN1 may consecutively call overlay function FN3 more often than overlay function FN2. Because overlay functions FN1, FN3 are in different overlays 112, 114 in this example, when overlay function FN1 calls overlay function FN3, overlay 114 is loaded into RAM 106 (if overlay 114 is not currently loaded in RAM 106). As a result, latency in system 102 increases because the controller 104 (or another entity, such as the AOM, not shown) performs activities to read overlay 114 from flash 108 and write overlay 114 into RAM 106. In addition, as RAM 106 is a finite resource, loading overlay 114 into RAM 106 may, in some cases, evict overlay 112 from RAM 106. When overlay function FN1 is subsequently called by a resident function (or by another overlay function FN2-FN6 executing in RAM 106), overlay 112 would then have to be re-loaded into RAM 106 prior to executing overlay function FN1.

During operation of system 102, controller 104 monitors consecutive function calls between overlay functions FN1-FN6 and generates Consecutive Call Information (CCI) 120 that captures this information. Generally, CCI 120 records a call relationship between overlay functions FN1-FN6. For example, during monitoring of the consecutive function calls between overlay functions FN1-FN6, controller 104 may determine that a large number of function calls occurred between overlay functions FN1 and FN3. FN1 may be the calling function or the called function. Regardless, CCI 120 stores this information about overlay functions FN1 and FN3, and the information is used during an overlay function re-grouping process (described in more detail below) where overlay functions FN1 and FN3 are grouped together in a new overlay. Grouping, for example, overlay functions FN1 and FN3 together in the same overlay, allows overlay functions FN1 and FN3 to call each without entailing overlay swapping into and out of RAM 106. CCI 120 may be generated over a time window or time period, may be generated based on one or more triggers, etc. In some embodiments, CCI 120 is generated constantly or nearly constantly in the background, while regrouping overlay functions FN1-FN6 are performed periodically, in response to one or more triggers, etc. In some cases, improving the performance of system 102 may be the main goal, while in other cases, the improvements in the performance of system 102 may be balanced with minimizing the number of program/erase cycles for flash 108.

Figure 2:
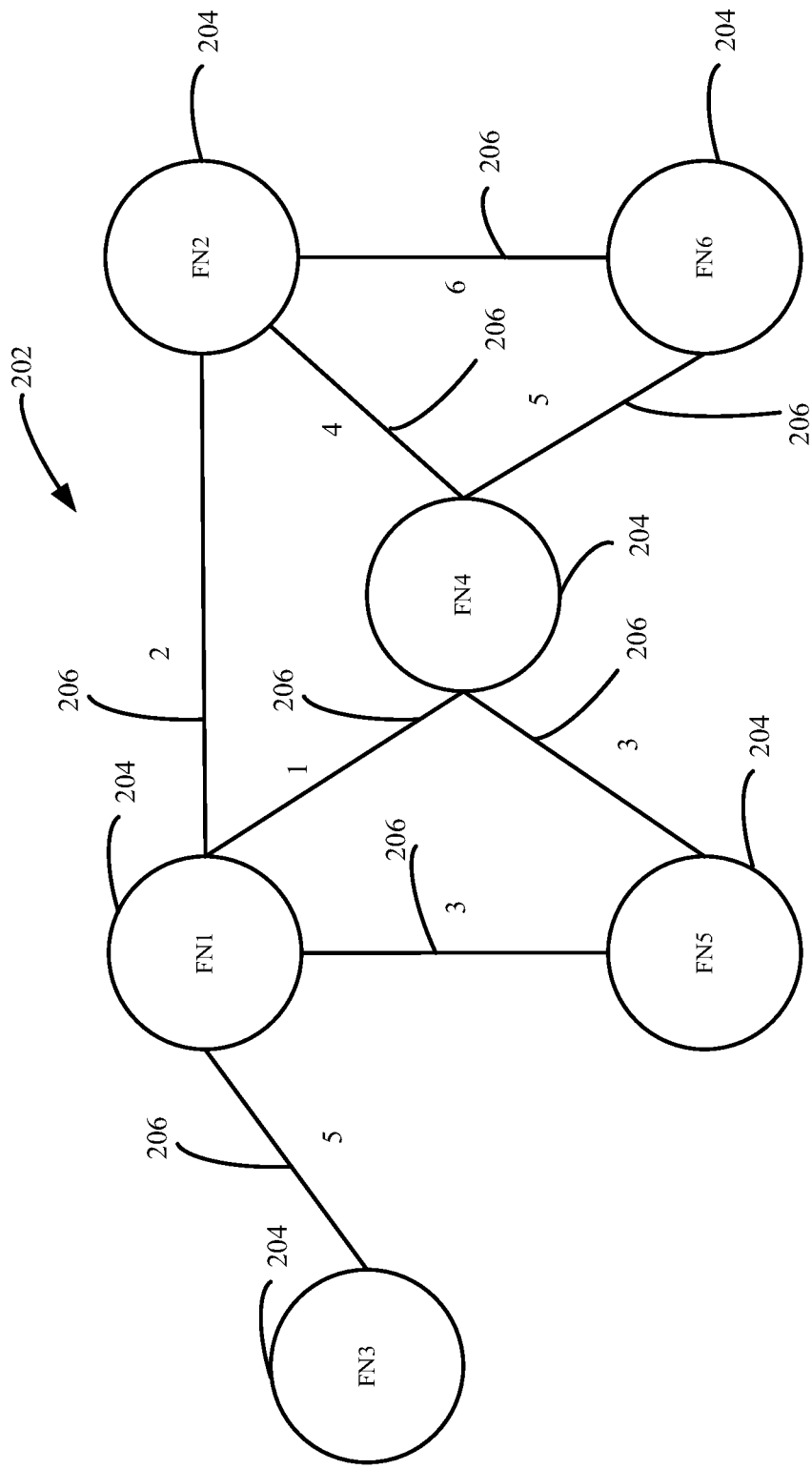
FIG. 2 illustrates a weighted edge graph used to represent consecutive call information for overlay functions according to an example.
Figure 3:
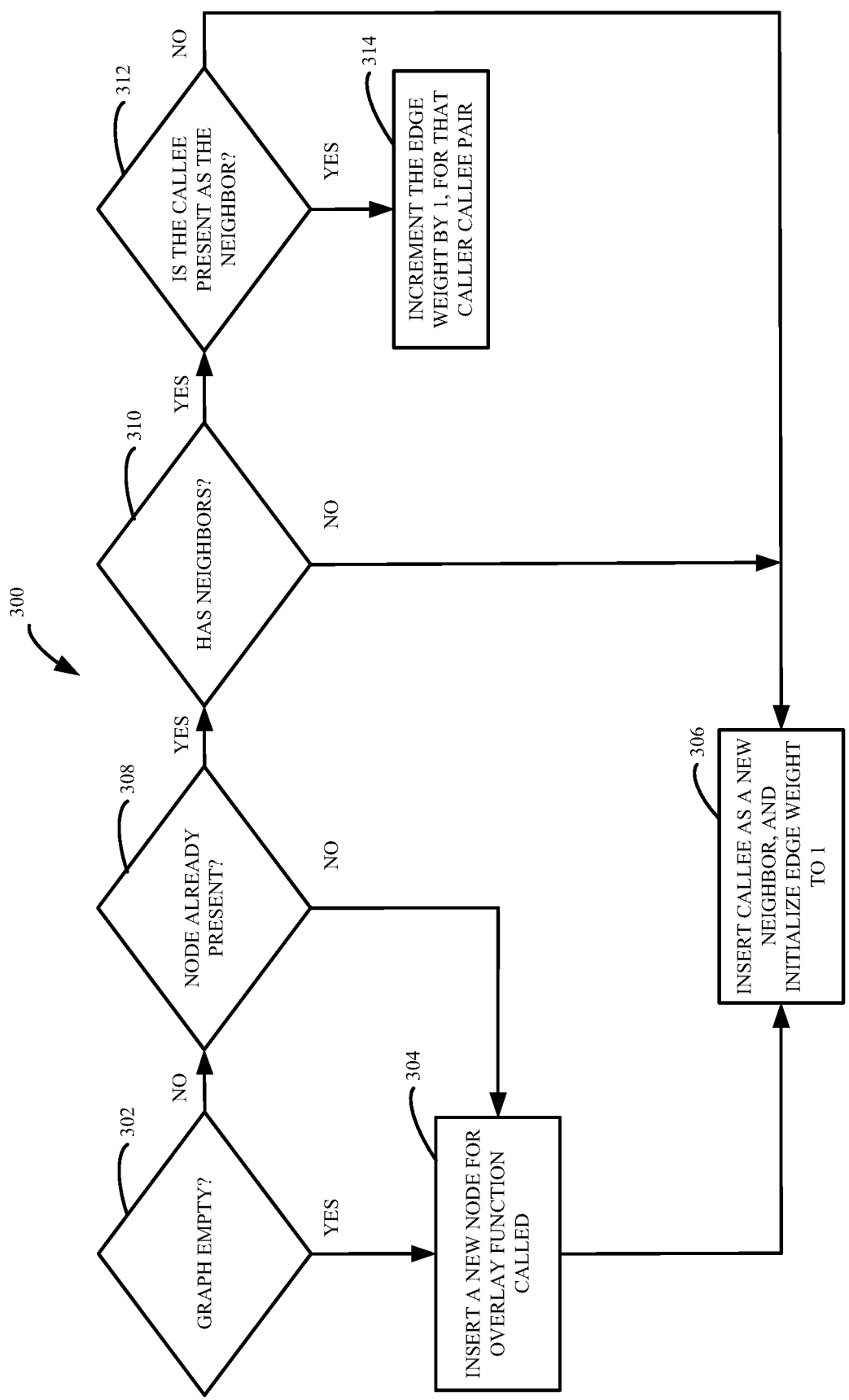
FIG. 3 illustrates a method of populating a weighted edge graph according to an example.

In some examples, CCI 120 comprises a weighted edge graph. Generally, a weighted edge graph is a graph where each branch between nodes is given a numerical weight. In this case, each branch is given a numerical weight based on the consecutive function calls between the nodes, and the nodes are overlay functions. FIG. 2 illustrates CCI 120 when CCI 120 comprises a Weighted Edge Graph (WEG) 202 according to an example, and FIG. 3 illustrates a method 300 of populating WEG 202 according to an example. The operations of the methods described herein are not all inclusive, and the methods described herein may include other operations, not shown. Further, the operations of the methods described herein may be performed in a different order. Method 300 will be described with respect to system 102 of FIG. 1, although method 300 may be performed by other systems, not shown.

In FIG. 2, the overlay functions FN1-FN6 are nodes 204 of WEG 202 and branches 206 between nodes 204 indicates consecutive call activity between nodes 204. Referring again to FIG. 3, if controller 104 determines that WEG 202 is initially empty (see operation 302), then controller 104 inserts a new node 204 into WEG 202 for the overlay function FN1-FN6 that was called (see operation 304). A callee is inserted into WEG 202 as a neighbor, and the edge weight for a corresponding branch 206 is initialized to one (see operation 306). Returning to operation 302, if controller 104 determines that WEG 202 is not empty, then controller 104 determines if node 204 is already present in WEG 202 for the overlay function FN1-FN6 that was called (see operation 308). If node 204 is not present, then operation 304 is performed to insert a new node 204. If node 204 is present in WEG 202, then controller 104 determines if node 206 has neighbors (see operation 310). Operation 306 is preformed if node 204 is present but has no neighbors to insert the callee as a new neighbor. If node 204 does have neighbors, then controller 104 determines if the callee is present as a neighbor in WEG 202 (see operation 312). If the callee is not present as a neighbor, the processing returns to operation 306 to insert the callee as a neighbor. If controller 104 determines that the callee is present as a neighbor in WEG 202, then controller 104 increments the edge weight by one for that caller-callee pair (see operation 314). Controller 104 repetitively performs the operations of method 300 each time an overlay function FN1-FN6 is called, populating WEG 202 while monitoring the calling activity for overlay functions FN1-FN6.

In the example WEG 202 of FIG. 2, five consecutive function calls were observed between overlay functions FN3 and FN1. Whether FN1 is the callee or the caller is less important than their relationship to each other. Further, only one consecutive function call was observed between overlay functions FN1, FN4, while six consecutive function calls were observed between overlay functions FN2, FN6. In original overlay binary 110 of FIG. 1, overlay functions FN2, FN6 are in different overlays 112, 116. Thus, the current configuration of how overlay functions FN1-FN6 are organized in overlays 112, 114, 116 is potentially inefficient during runtime.

In order to improve the overall performance of system 102 during runtime, controller 104 utilizes CCI 120 identified for overlay functions FN1-FN6 during runtime in order to dynamically re-group overlay functions FN1-FN6 into new overlays 122, 124, 126. Overlays 122, 124, 126 organize overlay functions FN1-FN6 more efficiently based on their actual runtime consecutive call activity. In the example re-grouping, overlay 122 includes overlay functions FN1, FN3, overlay 124 includes overlay functions FN2, FN6, and overlay 126 includes overlay functions FN4, FN5. Further, controller 104 generates a new offset table 128, based on the new organization of overlay functions FN1-FN6 in overlays 122, 124, 126. Generally, offset table 128 stores indexing information for calling overlay functions FN1-FN6 after the appropriate overlay 122, 124, 126 is loaded into RAM 106. In contrast to offset table 118, which was generated at compile time or build time based on how overlay functions FN1-FN6 are grouped in overlays 112, 114, 116, offset table 128 is dynamically created during runtime based on how overlay functions FN1-FN6 are re-grouped in overlays 122, 124, 126.

In addition to CCI 120, controller 104 may utilize additional criteria for re-grouping overlay functions FN1-FN6. For example, modifications to how overlay functions FN1-FN6 are re-grouped may include, at least, the size or relative size of overlay functions FN1-FN6. For instance, even if the number of consecutive function calls that were observed between overlay functions FN1, FN3 exceeds a threshold, a size difference between overlay functions FN1, FN3 may ultimately warrant that overlay functions FN1, FN3 are re-grouped into different overlays 122, 124, 126. However, even with size constraint considerations during re-grouping, the performance of system 102 is still improved over the arbitrary grouping of overlay functions FN1-FN6 implemented at compile time or build time for the firmware of system 102.

Collectively, overlays 122, 124, 126 are stored as an optimized overlay binary 130 in flash 108. Optimized overlay binary 130 is a collection of executable code that that is based on the original overlay functions FN1-FN6 stored in original overlay binary 110. Both the number of overlays 122, 124, 126 depicted for optimized overlay binary 130 and the overlay functions FN1-FN6 stored by the overlays 122, 124, 124 are illustrated merely for purposes of discussion, and optimized overlay binary 130 may include a different number of overlays 122, 124, 126 and overlay functions FN1-FN6 in other examples.

In order to dynamically re-group overlay functions FN1-FN6 and generate overlays 122, 124, 126, controller 104 reads overlay functions FN1-FN6 from flash 108, currently stored at original overlay binary 110, re-groups overlay functions FN1-FN6 as overlays 122, 124, 126, and writes overlays 122, 124, to a new location in flash 108, corresponding to optimized overlay binary 130. For example, in order to generate overlay 122, controller 104 reads overlay functions FN1, FN3 from overlays 112, 114 in flash 108, and writes overlay functions FN1, FN2 to a new location in flash 108 corresponding to overlay 122 at optimized overlay binary 130. In order to generate overlay 124, controller 104 reads overlay functions FN2, FN6 from overlays 112, 116 in flash 108, and writes overlay functions FN2, FN6 to a new location in flash 108 corresponding to overlay 124 at optimized overlay binary 130. In order to generate overlay 126, controller 104 reads overlay functions FN4, FN5 from overlays 114, 116 in flash 108, and writes overlay functions FN4, FN5 to a new location in flash 108 corresponding to overlay 124 at optimized overlay binary 130.

As discussed previously, problems can arise when consecutive overlay function calls are made to overlay functions FN1-FN6 that are included in different overlays 112, 114, 116 (e.g., the original overlay function grouping of system 102). However, after generating overlays 122, 124, 126, system 102 can operate more efficiently by reducing the swapping of overlays 122, 124, 126 into and out of RAM 106, because consecutive function calls between overlay functions FN1-FN6 are more likely to be loaded into RAM 106 when they are in the same overlay.

For example, overlay function FN1 may consecutively call overlay function FN3 more often than calling overlay function FN2. Because overlay functions FN1, FN3 have been regrouped to be in the same overlay 122, when overlay function FN3 is called by overlay function FN1, overlay function FN3 is already loaded into RAM 106 (because overlay 122 was loaded in RAM 106 previously in order to execute overlay function FN1). The result is that latency for function calls between overlay functions FN1, FN3 is reduced, which improves the performance of system 102.

Dynamically re-grouping overlay functions FN1-FN6 during runtime into different overlays 122, 124, 126 may be performed in response to different triggers. For example, the triggers may include a time period, an idle time for system 102, a threshold, etc. The threshold may include the number of consecutive function calls between overlay functions FN1-FN6 being greater than a threshold value, a percentage of overlay functions FN1-FN6 that warrant re-grouping is greater than a threshold percentage, etc. For example, five consecutive function calls detected between overlay functions FN1, FN3 may warrant re-grouping overlay function FN1, FN3 together, if they are initially in different overlays 112, 114, 116. In another example, determining that 25% of overlay functions FN1-FN6 could be re-grouped based on CCI 120 may warrant re-grouping overlay functions FN1-FN6. Further, re-grouping overlay functions FN1-FN6 could be performed in the background in some examples. For instance, a new Garbage Collection (GC) task could be added to the firmware of system 102 to perform re-grouping of overlay functions FN1-FN6 during idle times of system 102.

Although the re-grouping process performed during runtime may occur during use of system 102 by an end user as a background task for system 102, other options exist.

Typically, firmware regression testing is performed by operating the firmware on system 102 through various different control paths by running multiple test cases on system. However, a single test case to test all the scenarios is difficult to implement and may entail a long run time to implement the regression testing. Test environments can have multiple scenarios tested, including normal read/write patterns, unaligned read/write patterns, error injection tests, mimicking file systems, temperature changes, etc., in order to determine how system 102 responds to different test environments.

Figure 4:
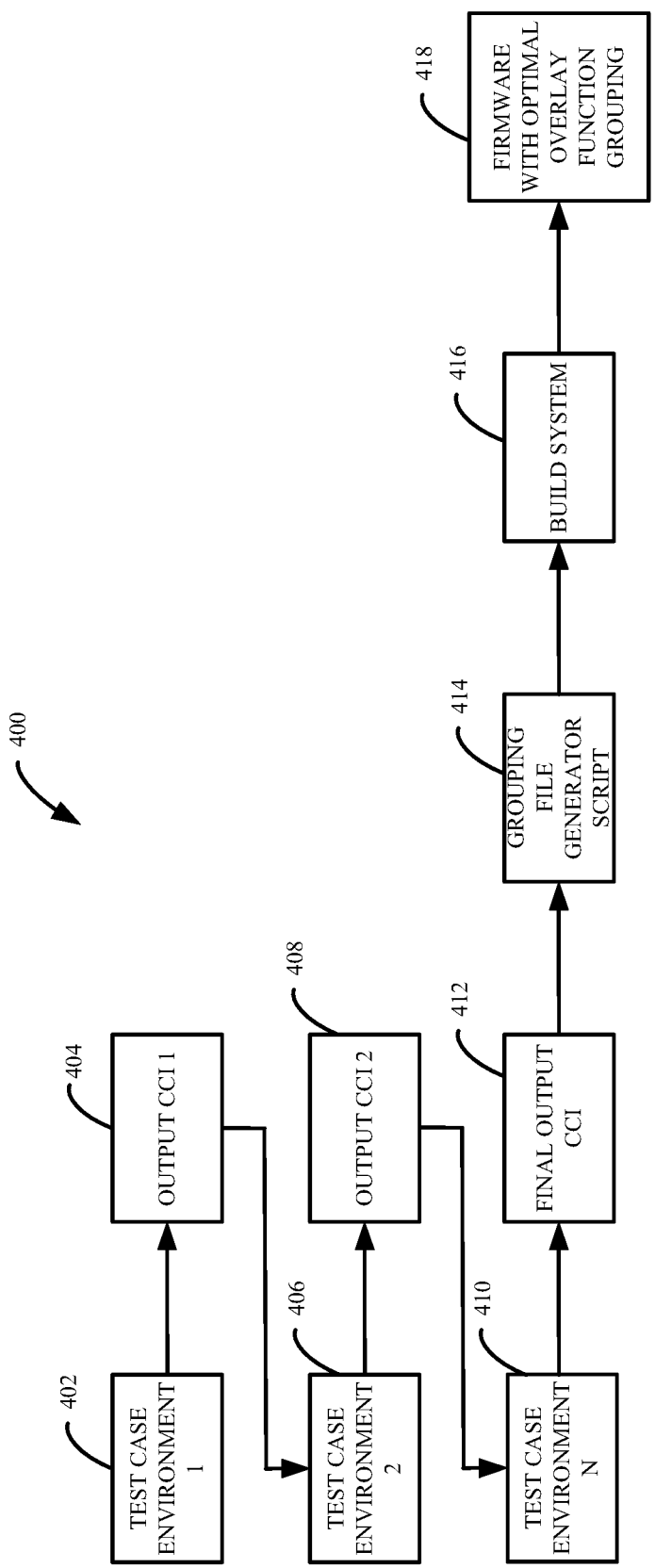
FIG. 4 illustrates a block diagram of a test process for generating consecutive call information according to an example.

The previously described process to generate CCI 120 (which may be, for example, a weighted edge graph) is performed based on the paths taken by the firmware executing on system 102 during the execution of a test case. FIG. 4 illustrates a block diagram 400 of a test process for generating CCI 120 in an example. In block 402, system 102 is operated in test case environment one, and CCI 120 is generated based on the consecutive calls made between overlay functions FN1-FN6 in block 402. In block 404, CCI 120 is exported out of system 102 using, for example, a diagnostic command, and is fed as input into test case environment two, in block 406.

In block 406, system 102 is operated in test case environment two. CCI 120 is again generated based on the consecutive calls made between overlay functions FN1-FN6 in block 406. In block 408, CCI 120 is exported out of system 102 using, for example, a diagnostic command, and is fed as input into test case environment N, in block 410, where N>2. At the end of all test cases, a final CCI 120 is recovered in block 412, and has a majority of the scenarios covered. The final CCI 120 is parsed by a script in block 414 to generate a grouping file for overlay functions FN1-FN6, which in-turn is provided as an input to a build system in block 416. The build system in block 416 generates new firmware for system 102 in block 418 that optimally defines how overlay functions FN1-FN6 are organized into overlays for system 102. For instance, the new firmware for system 102 may be used to replace overlays 112, 114, 116 with updated overlays, thereby improving the performance of system 102 prior to runtime. However, system 102 may still perform dynamic re-grouping of overlay functions FN1-FN6 during runtime to improve the performance of system 102 further.

Figure 5:
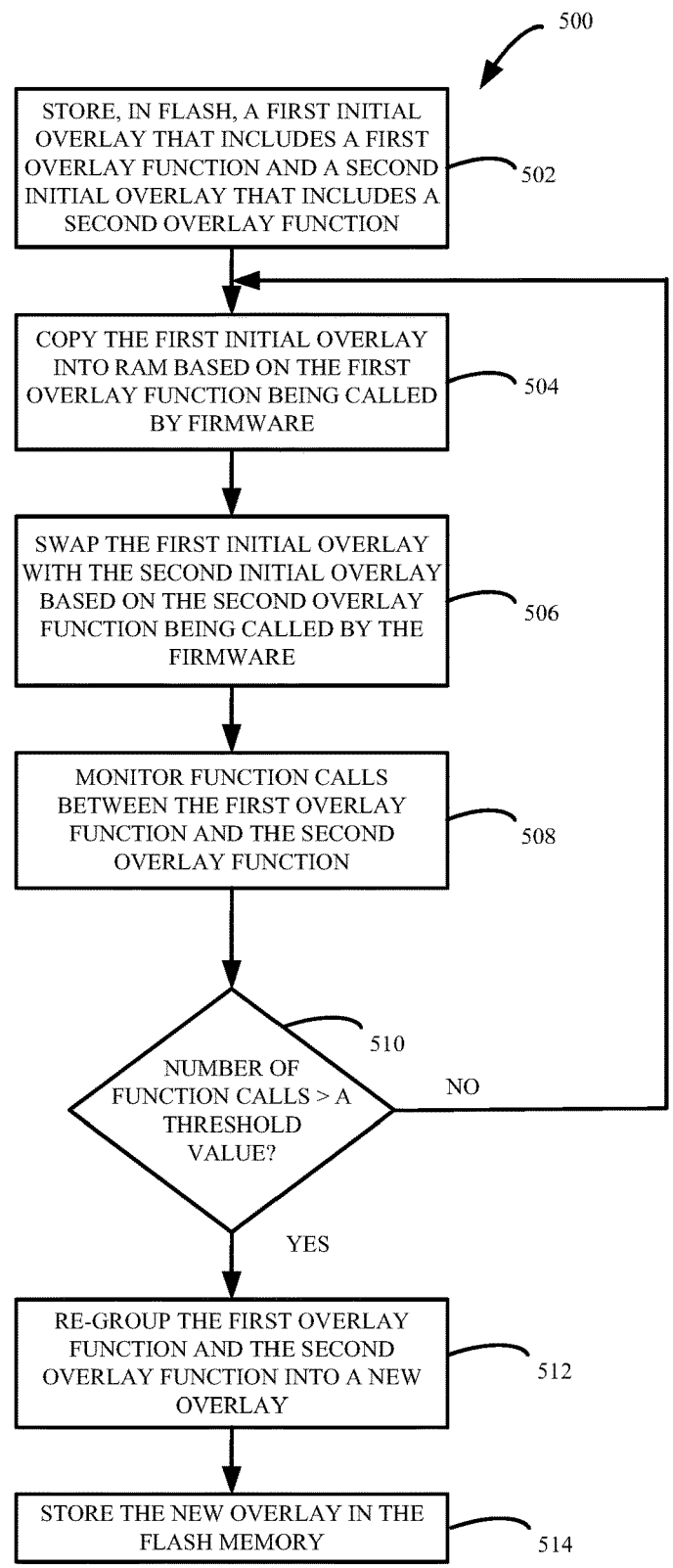
FIG. 5 illustrates a method of dynamically re-grouping overlay functions according to an example.

FIG. 5 illustrates a method 500 of dynamically re-grouping overlay functions according to an example. Method 500 begins by storing, in a flash memory, a first initial overlay and a second initial overlay, where the first initial overlay includes a first overlay function and the second initial overlay includes a second overlay function (see operation 502). For example, overlay 112 (including overlay function FN1) and overlay 114 (including overlay function FN2) are stored in flash 108 (see FIG. 1). Method 500 continues by copying the first initial overlay into RAM based on the first overlay function being called by the firmware (see operation 504). For example, if overlay function FN1 is called, then overlay 112 is copied from flash 108 into RAM 106. Method 500 continues by swapping the first initial overlay with the second initial overlay based on the second overlay function being called by the firmware (see operation 506). For instance, if overlay function FN3 is called, then overlay 112 is swapped with overlay 114 in RAM 106. Method 500 continues by monitoring function calls between the first overlay function and the second overlay function over a monitoring period (see operation 508). For instance, function calls between overlay functions FN1, FN3 are monitored. Method 500 continues by determining whether the number of function calls between the first overlay function and the second overlay function is greater than a threshold value (see operation 510). For example, method 500 determines whether the number of function calls between overlay functions FN1, FN3 is greater than a threshold value. If the number of function calls is less than the threshold value, then processing returns to operation 504. Based in part on determining that the number of function calls is greater than the threshold value, then method 500 continues by re-grouping the first overlay function and the second overlay function into a new overlay (see operation 512). For instance, overlay functions FN1, FN3 are re-grouped into overlay 122. Method 500 continues by storing the new overlay in the flash memory (see operation 514). For instance, overlay 122 is stored in flash 108. In some examples, the new overlay is copied into the RAM based, at least in part, on either the first overlay function or the second overlay function being called for execution by the firmware. For instance, overlay 122 is copied into RAM 106 when either overlay function FN1 or overlay function FN3 is called for execution by the firmware of system 102.

An example technical effect of the systems and method described herein include at least one of: (a) improving the performance of firmware execution for consecutive calls between overlay functions, without adding resources to the system; (b) reducing overlay swapping into and out of RAM during execution of the firmware; and (c) reducing the overlay swaps into RAM, which in turn reduces the number of reads performed of the flash and therefore, reduces a read disturb of data stored by the flash.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of:

A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A system for dynamically re-grouping overlay functions, comprising:
   a flash memory configured to store a first initial overlay and a second initial overlay, wherein the first initial overlay includes a first overlay function and the second initial overlay includes a second overlay function;
   a Random-Access Memory (RAM); and
   a controller configured to:
      copy the first initial overlay into the RAM based on the first overlay function being called for execution by firmware;
      swap the first initial overlay with the second initial overlay based on the second overlay function being called for execution by the firmware;
      monitor function calls between the first overlay function and the second overlay function over a monitoring period;
      determine whether a number of the function calls is greater than a threshold value; and
      based, at least in part, on the number of the function calls being greater than the threshold value, re-group the first overlay function and the second overlay function into a new overlay; and
      store the new overlay in the flash memory.

2. The system of claim 1, wherein the controller is further configured to:
   copy the new overlay into the RAM based, at least in part, on either the first overlay function or the second overlay function being called for execution by the firmware.

3. The system of claim 1 wherein the controller is further configured to:
   generate a new offset table that maps the first overlay function and the second overlay function to the new overlay; and
   store the new offset table in the flash memory.

4. The system of claim 3, wherein the controller is further configured to:
   copy the new overlay into the RAM based, at least in part, on the new offset table.

5. The system of claim 1, wherein the first initial overlay and the second initial overlay are pre-defined at a compile time or a build time of the firmware, and the new overlay is dynamically defined during a runtime of the firmware.

6. The system of claim 1, wherein the controller is further configured to:
   export the number of the function calls to an external system.

7. The system of claim 6, wherein the controller is further configured to:
   receive, from the external system, an updated first initial overlay and an updated second initial overlay based on the number of the function calls, wherein one of the updated first initial overlay and the updated second initial overlay includes the first overlay function and the second overlay function; and
   replace, in the flash memory, the first initial overlay and the second initial overlay with the updated first initial overlay and the updated second initial overlay.

8. A method of dynamically re-grouping overlay functions, comprising:
   storing, in a flash memory, a first initial overlay and a second initial overlay, wherein the first initial overlay includes a first overlay function and the second initial overlay includes a second overlay function;
   copying the first initial overlay into a Random-Access Memory (RAM) based on the first overlay function being called for execution by firmware;
   swapping the first initial overlay with the second initial overlay based on the second overlay function being called for execution by the firmware;
   monitoring function calls between the first overlay function and the second overlay function over a monitoring period;
   determining whether a number of the function calls is greater than a threshold value; and
   based, at least in part, on the number of the function calls being greater than the threshold value, re-grouping the first overlay function and the second overlay function into a new overlay; and
   storing the new overlay in the flash memory.

9. The method of claim 8, further comprising:
   copying the new overlay into the RAM based, at least in part, on either the first overlay function or the second overlay function being called for execution by the firmware.

10. The method of claim 8, further comprising:
    generating a new offset table that maps the first overlay function and the second overlay function to the new overlay; and
    storing the new offset table in the flash memory.

11. The method of claim 10, further comprising:
    copying the new overlay into the RAM based, at least in part, on the new offset table.

12. The method of claim 8, the first initial overlay and the second initial overlay are pre-defined at a compile time or a build time of the firmware, and the new overlay is dynamically defined during a runtime of the firmware.

13. The method of claim 8, further comprising:
    exporting the number of the function calls to an external system.

14. The method of claim 13, further comprising:
    receiving, from the external system, an updated first initial overlay and an updated second initial overlay based on the number of the function calls, wherein one of the updated first initial overlay and the updated second initial overlay includes the first overlay function and the second overlay function; and
    replacing, in the flash memory, the first initial overlay and the second initial overlay with the updated first initial overlay and the updated second initial overlay.

15. A system for dynamically re-grouping overlay functions, comprising:
    a flash memory;
    a Random-Access Memory (RAM);
    means for storing a first initial overlay and a second initial overlay, wherein the first initial overlay includes a first set of overlay functions and the second initial overlay includes a second set of overlay functions;
    means for copying the first initial overlay into the RAM based on at least one overlay function of the first set of overlay functions being called for execution by firmware;

means for swapping the first initial overlay with the second initial overlay based on at least one overlay function of the second set of overlay functions being called for execution by the firmware;

means for determining a number of function calls between each of the first set of overlay functions and the second set of overlay functions over a monitoring period;

based, at least in part, on the number of function calls being greater than a threshold value, means for re-grouping the at least one overlay function from each of the first set of overlay functions and the second set of overlay functions into a new overlay; and means for storing the new overlay in the flash memory.

16. The system of claim 15, further comprising:
means for copying the new overlay into the RAM based, at least in part, on the at least one overlay function from each of the first set of overlay functions and the second set of overlay functions being called for execution by the firmware.

17. The system of claim 15, further comprising:
means for generating a new offset table that maps the at least one overlay function from each of the first set of overlay functions and the second set of overlay functions to the new overlay; and means for storing the new offset table in the flash memory.

18. The system of claim 17, further comprising:
means for copying the new overlay into the RAM based, at least in part, on the new offset table.

19. The system of claim 15, wherein the first initial overlay and the second initial overlay are pre-defined at a compile time or a build time of the firmware, and the new overlay is dynamically defined during a runtime of the firmware.

20. The system of claim 15, further comprising:
means for exporting the number of function calls between each of the first set of overlay functions and the second set of overlay functions to an external system;

means for receiving, from the external system, an updated first initial overlay and an updated second initial overlay based on the number of function calls, wherein one of the updated first initial overlay and the updated second initial overlay includes the at least one overlay function from each of the first set of overlay functions and the second set of overlay functions; and means for replacing, in the flash memory, the first initial overlay and the second initial overlay with the updated first initial overlay and the updated second initial overlay.

* * * * *

UNITED STATES PATENT AND TRADEMARK OFFICE
CERTIFICATE OF CORRECTION

| | |
|---|---|
| PATENT NO. | : 11,809,750 B1 |
| APPLICATION NO. | : 17/729346 |
| DATED | : November 7, 2023 |
| INVENTOR(S) | : Venkatesh Naidu Pamoti, Sabith BN and Disha Parwani |

It is certified that error appears in the above-identified patent and that said Letters Patent is hereby corrected as shown below:

On the Title Page

Column 1, item (72), delete Inventor name "Sabith B N" and insert therefor -- Sabith BN --.

Signed and Sealed this
Thirteenth Day of February, 2024

Katherine Kelly Vidal
*Director of the United States Patent and Trademark Office*